US010559784B2

(12) United States Patent
Striegel et al.

(10) Patent No.: US 10,559,784 B2
(45) Date of Patent: Feb. 11, 2020

(54) INSULATING MOLDING FOR A BATTERY CELL

(71) Applicant: Robert Bosch GmbH, Stuttgart (DE)

(72) Inventors: Kai-Uli Striegel, Stegaurach (DE); Martin Gerlach, Strullendorf (DE); Thomas Kretschmar, Zapfendorf (DE); Timo Kegel, Memmelsdorf (DE)

(73) Assignee: Robert Bosch GmbH, Stuttgart (DE)

( * ) Notice: Subject to any disclaimer, the term of this patent is extended or adjusted under 35 U.S.C. 154(b) by 184 days.

(21) Appl. No.: 15/716,783

(22) Filed: Sep. 27, 2017

(65) Prior Publication Data
US 2018/0097209 A1 Apr. 5, 2018

(30) Foreign Application Priority Data
Sep. 30, 2016 (DE) .................. 10 2016 219 010

(51) Int. Cl.
| H01M 2/04 | (2006.01) |
| H01M 2/02 | (2006.01) |
| H01M 10/0525 | (2010.01) |
| B29C 45/00 | (2006.01) |
| B29D 24/00 | (2006.01) |

(52) U.S. Cl.
CPC ....... *H01M 2/0417* (2013.01); *H01M 2/0217* (2013.01); *H01M 2/0277* (2013.01); *B29C 45/0001* (2013.01); *B29D 24/00* (2013.01); *H01M 10/0525* (2013.01)

(58) Field of Classification Search
CPC ............. H01M 2/1027; H01M 2/0277; H01M 2/0417; H01M 2/02; H01M 2/029
See application file for complete search history.

(56) References Cited

U.S. PATENT DOCUMENTS

| 2003/0077505 A1* | 4/2003 | Goda ................. H01M 2/0207 429/56 |
| 2005/0181272 A1* | 8/2005 | Kim .................... H01M 2/0202 429/56 |
| 2006/0051666 A1* | 3/2006 | Kim .................... H01M 2/0207 429/184 |
| 2008/0145747 A1* | 6/2008 | Wu ..................... H01M 2/0202 429/56 |
| 2010/0028765 A1 | 2/2010 | Doege et al. |
| 2012/0015223 A1* | 1/2012 | Bhardwaj ........... H01M 2/1027 429/94 |

FOREIGN PATENT DOCUMENTS

| DE | 102006060018 | 6/2008 |
| DE | 102014220124 | 4/2016 |
| JP | 2003059471 | 2/2003 |

* cited by examiner

*Primary Examiner* — Maria Laios
(74) *Attorney, Agent, or Firm* — Michael Best & Friedrich LLP

(57) ABSTRACT

An insulating molding (1) for a housing of at least one battery cell is disclosed, specifically for a housing of at least one lithium-ion battery cell, wherein, on at least one molding sidewall (3a, 3b) of the insulating molding (1), a depression (5) is configured, which is constituted by means of a reduced wall thickness, in order to reduce the force acting on the battery cell.

19 Claims, 3 Drawing Sheets

INSULATING MOLDING FOR A BATTERY CELL

BACKGROUND OF THE INVENTION

The present invention relates to an insulating molding for a housing of at least one battery cell, to a battery cell, specifically a lithium-ion battery cell, and to a battery.

A battery cell is an electrochemical energy store which, upon the discharging thereof, converts stored chemical energy into electrical energy by an electrochemical reaction. It transpires that, in future, whether in stationary applications such as wind turbines, in motor vehicles which are configured as hybrid or electric vehicles, and in electronic devices, new battery systems will be employed which will be subject to very stringent requirements, with respect to reliability, safety, performance capability and service life.

On the grounds of their high energy density, lithium-ion batteries are specifically employed as energy stores for electrically-powered motor vehicles.

Battery cells, specifically lithium-ion battery cells, are configured, for example, with an electrode assembly comprised of a cathode, a separator and an anode which, for example, are interwound or stacked one on top of another. The cathode comprises, for example, a cathode foil, which is coated with an active material, and the anode comprises, for example, an anode foil, which is coated with an active material. The cathode foil is comprised, for example, of aluminum, and the anode foil is comprised, for example, of copper. The battery cell housing is comprised, for example, of a metal, a plastic, or a combination of plastic and metal. It can be of prismatic design, or of a different shape from the latter.

At present, battery cells are mutually electrically insulated, for example by means of polymer-based materials. These include, for example, films, adhesive tapes, shrink-on tubing, insulating lacquer or housing shells of plastic composition.

A plurality of battery cells are mechanically combined to form modules, and are connected, for example, in parallel or in series.

In US 2010/0028765, a rechargeable battery is disclosed, the battery cells of which are respectively arranged in a housing. The housing incorporates a filler material, which encloses the battery cells. The housing is variously formed, and has different segments with different wall thicknesses.

US 2006/0051666 discloses a battery cell with a housing, wherein said housing incorporates a compensating element for the expansion of the battery cell. This element can be configured such that that housing wall, at the relevant position, has an inward-facing offset, whereby the wall thickness remains constant.

SUMMARY OF THE INVENTION

According to the invention, an insulating molding for a housing of at least one battery cell is disclosed, together with a battery cell, and a battery.

Over the service life of a battery cell, the internal pressure in the latter increases, and a distension of the battery cell occurs which is attributable, inter alia, to the distension of the active material of the electrode associated, for example, with the deposition and precipitation of lithium during charging processes and/or with the formation of gas in the interior of the battery cell. This can lead to a depletion of storage capacity, and thus to the premature ageing of the battery cell which, in turn, is associated with a substantial loss of capacity of the battery cell. As a counteracting measure, and for the mechanical fixing of battery cells in order, for example, to prevent vibratory movements of the latter, the battery cells which, for example, are combined to form modules, are mechanically braced together, and are secured accordingly. The frequently very high clamping forces thus generated are associated with very high loading, and thus, for example, with a depletion in the porosity of the separator. Moreover, localized overloading occurs on the electrodes, with the formation, for example, of porous dendritic lithium deposits. These grow, for example, perpendicularly to the anode, in the form of dendrites on the anode, and can penetrate spatially consecutive elements, for example a separator which is arranged between the anode and the cathode. This generally results in an internal short-circuit.

The insulating molding according to the invention for a housing of a battery cell, on at least one molding sidewall, incorporates a depression, which is constituted by means of a reduced wall thickness. This insulating molding has an advantage, in that the depression forms a void which, initially, is not occupied. In the course of its service life, the battery cell expands, and progressively fills the void formed by the depression in the insulating molding, or compresses the sidewall of the molding outwards at the location of the depression. As the battery cell, upon the expansion thereof, for example by distension or the formation of gas, can occupy the space formed by the void, and does not immediately engage with a sidewall of the insulating molding which incorporates no depression, or can find space to expand through the depression, such that the sidewall of the molding is compressed outwards at the location of the depression, the force acting on the battery cell is reduced. In this manner, an increase in the internal pressure of the battery is substantially reduced, or is prevented altogether.

As a result, in turn, the clamping force which is applied to the battery cells for the mechanical clamping thereof, for the purposes of mechanical fixing, can be limited, such that a reduced load is applied to the battery cells. In consequence, the functional capability of components in the interior of the battery cells, such as, for example, the separator or the electrodes, is prolonged. Moreover, the safety of the battery cells is enhanced, as loads applied to the components of the battery cells are minimized, such that deterioration of the latter is prevented and accordingly, for example, no short-circuit occurs.

At the same time, the battery cells are mechanically secured by the insulating molding, and the requisite degree of clamping force is applied thereto by the insulating molding.

According to the invention, the insulating molding thus assumes two functions. It ensures the requisite retaining or clamping force and, by the reduced rigidity of the insulating molding in the depression, simultaneously ensures that no additional force is generated on the battery cell during the service life of the latter.

In one advantageous form of embodiment, the insulating molding comprises at least four molding sidewalls, which are specifically configured with a full-surface design. Advantageously, by means of the insulating molding, all lateral surfaces of the battery cell housing, which might otherwise come into contact with battery cells arranged in proximity to the housing surfaces, are enclosed by the molding, and are thus electrically insulated. The molding moreover provides mechanical protection for the battery cell, on all the battery cell housing sidewalls with which the molding specifically has full-surface contact. Particularly advantageously, moreover, the insulating molding clamps the battery cell, and no or only limited further means are required to generate a clamping force on the battery cell.

Alternatively, the insulating molding comprises at least four molding sidewalls, which are specifically configured with a full-surface design, and a molding base, which is specifically configured with a full-surface design. As a further alternative, the insulating molding comprises at least four molding sidewalls, which are specifically configured with a full-surface design, and a molding top cover. Naturally, in this form of embodiment, a base can additionally be configured. Advantageously, the battery cell, which is enclosed by the molding, is additionally electrically insulated and mechanically protected on its base surface by the molding base, and/or on its top surface by the molding top cover. Moreover, by means of the additional molding base and/or the additional molding top cover, clearances and creepage distances between battery cells, the battery cell sidewalls of which are arranged adjacently, can be eliminated. A creepage distance is defined here as the shortest distance along the surface of a solid insulator between two conductive parts. A clearance is defined as the shortest distance between two conductive parts.

In insulating moldings for battery cells, the housing of which is of prismatic design, with two long battery cell sidewalls and two short battery cell sidewalls, it is particularly advantageous if the depression is incorporated in one or both of the long molding sidewalls, as the greatest distension of battery cells occurs on the long sides thereof. The depression in the insulating molding is thus positioned directly at the location of the greatest distension of the battery cell, and can compensate the latter in a particularly effective manner.

In a particularly advantageous form of embodiment, the insulating molding lies, specifically directly, on the housing sidewalls of a battery cell, or the insulating molding lies, specifically directly, on the housing sidewalls of the battery cell and on a housing base and/or a housing top cover of the battery cell. By this arrangement, advantageously, no space in the battery is unnecessarily surrendered, and the depression(s) in the insulating molding, by direct contact, are particularly effectively occupied by the distending battery cell, or the molding sidewalls at the location of the depression are particularly effectively compressed outwards.

In a preferred form of embodiment, the reduction in wall thickness is applied to the outer side of the at least one molding sidewall, such that the depression is configured in the direction of the battery cell which is at least partially enclosed by the insulating molding. Advantageously, the molding sidewall in the depression is less robust, and thus more susceptible to movement, than the molding sidewall in the area outside the depression. Upon an increase in the volume of the battery cell, the molding sidewall in the depression thus yields to a greater extent, and exerts less pressure on the battery cell than the insulating molding at locations outside the depression. The internal workings of the battery cell are thus protected, and no overloading of the electrodes and the separator occurs.

In a particularly preferred form of embodiment, the reduction in wall thickness is applied to an inner side of the at least one molding sidewall, such that the depression extends away from the battery cell which is at least partially enclosed by the insulating molding. In this arrangement, advantageously, the depression is occupied by the distending battery cell, and reduced forces are thus exerted on the battery cell, thereby protecting the internal workings thereof. No overloading of the electrodes and the separator occurs.

In a further particularly preferred form of embodiment, the reduction in wall thickness is applied to an inner side and an outer side of the at least one molding sidewall, such that two, specifically mutually-opposing depressions are configured in the molding sidewall. In this case, the advantages of both the aforementioned forms of embodiment are exploited simultaneously.

In a preferred form of embodiment, it is advantageous if the outer side of the at least one molding sidewall, in the region of the reduction in wall thickness, is cambered inwards towards the battery cell, which is at least partially enclosed by the insulating molding. In an additional or alternative preferred form of embodiment, it is advantageous if the inner side of the at least one molding sidewall, in the region of the reduction in wall thickness, is cambered outwards from the battery cell, which is at least partially enclosed by the insulating molding, thus forming the depression. The wall thickness of the molding sidewall in the depression thus decreases or increases in a continuous manner. Consequently, there are no step-like transitions within the depression. Advantageously, by means of a cambered depression, the elasticity of the insulating molding likewise increases and decreases gradually, rather than abruptly. The battery cell which, upon distension, likewise assumes a cambered form, can thus optimally engage with the depression, where the latter is configured on the inner side of the molding sidewall. Moreover, the battery cell, at the location of the greatest camber, as a result of the likewise cambered form of the depression, for example, is thus exposed to an equally high pressure as at the location of the smallest camber, regardless of whether the depression in the insulating molding is configured on an inner or an outer side, or on an inner and an outer side of the molding sidewall.

In one form of embodiment, the depression is only partially cambered, for example, the wall thickness decreases or increases in a continuous manner but, in the center of the depression, the material thickness is constant, and shows no further decrease or increase.

In a particularly preferred form of embodiment, the depression is located in a central zone of the at least one molding sidewall, which is circumferentially enclosed by an edge zone of the at least one molding sidewall. This is advantageous, in that a battery cell in the central zone of the electrode assembly, comprising the electrodes and at least one separator, undergoes the greatest distension. The housing of the battery cell thus shows the greatest expansion in a central zone of the battery cell sidewall. The insulating molding incorporating the depression in a central zone is thus located exactly at the position of the greatest expansion of the battery cell, thus permitting the optimum compensation of the distension of the battery cell. Accordingly, no additional forces are applied to the battery cell as a result of distension.

In a further form of embodiment, the insulating molding is configured as a housing for at least one battery cell. Advantageously, in this manner, less housing material is required, thereby saving weight and, moreover, reducing material and production costs for the battery cell. It is further advantageous that the insulating molding is thus applied directly to the deformable components of the battery cell, and is not separated from the latter by a battery cell housing.

In an advantageous form of embodiment, the insulating molding is comprised of a plastic. Advantageously, plastic components can be manufactured in a very simple and cost-effective manner, and moreover are easily recyclable. In a particularly advantageous form of embodiment, the insulating molding is comprised of a thermoplastic material, for example a polyamide, a polyethylene, a polypropylene, a polyethylene terephthalate or a polyvinyl chloride, or mixtures thereof. Advantageously, these materials have very good welding properties.

Polyolefins are flexible, and have a high degree of mechanical and chemical stability. Of these, for example, polyethylene is characterized by high toughness, low water absorption and low water vapor permeability, shows good resistance to chemicals and is moreover easy to process and cost-effective. Polypropylene is characterized by low water absorption, is chemical-resistant, electrically-insulating, easy to process and cost-effective. Polyamide is characterized by high strength, high resistance to chemicals and weathering, and a limited tendency to stress crack formation. Polyvinyl chloride is chemical-resistant, has a high strength, and is cost-effective. Polyethylene terephthalates have a high rupture strength and temperature stability.

In one form of embodiment, the insulating molding is produced by an injection-molding process. By means of an injection-molding process, for example, plastic components with a complex geometry can be produced with high accuracy in short cycle times. Injection-molding processes are highly cost-effective methods, particularly for the production of large component numbers.

In an advantageous form of embodiment, the insulating molding has a beading at one edge of the molding sidewall. The beading can be configured on an upper side of the molding sidewall and/or on an underside of the molding sidewall if, for example, there is no molding base or molding top cover adjoining thereto. Advantageously, the beading can be employed as a positioning aid for the insulating molding during assembly, or during the operation of the battery cell.

In one form of embodiment, a battery comprises at least two battery cells, each having an insulating molding according to the invention, wherein the insulating moldings incorporate depressions of different sizes. Alternatively or additionally, the depressions in the insulating moldings are of different depths. Alternatively or additionally, the depressions are positioned, for example, in different molding sidewalls of the insulating molding and/or at different positions in said molding sidewall. Advantageously, the battery, by means of the forms of embodiment described in the present paragraph, can be configured in a highly flexible manner, and properties such as the stability, rigidity or flexibility of the constituent material of the insulating moldings can be individually tailored, according to the position of the associated battery cell in the battery. Thus, for example, insulating moldings of battery cells which are arranged adjacently to form a battery module, and are positioned in the center of the module, can be configured with larger and/or deeper depressions than the insulating moldings of battery cells which are arranged in an edge zone of the module. Advantageously, as required, the requisite distension space for each cell position in a modular assembly can be adjusted accordingly.

In an alternative form of embodiment, for example, insulating moldings of battery cells which are centrally-positioned in a module are configured with smaller and/or shallower depressions than the insulating moldings of battery cells which are arranged in an edge zone of the module.

In a further alternative form of embodiment, two or more battery cells can be inserted in an insulating molding according to the invention.

BRIEF DESCRIPTION OF THE DRAWINGS

Forms of embodiment of the present invention are represented in the drawing, and are described in detail in the following description of the figures. Herein.

DETAILED DESCRIPTION

Figure 1:
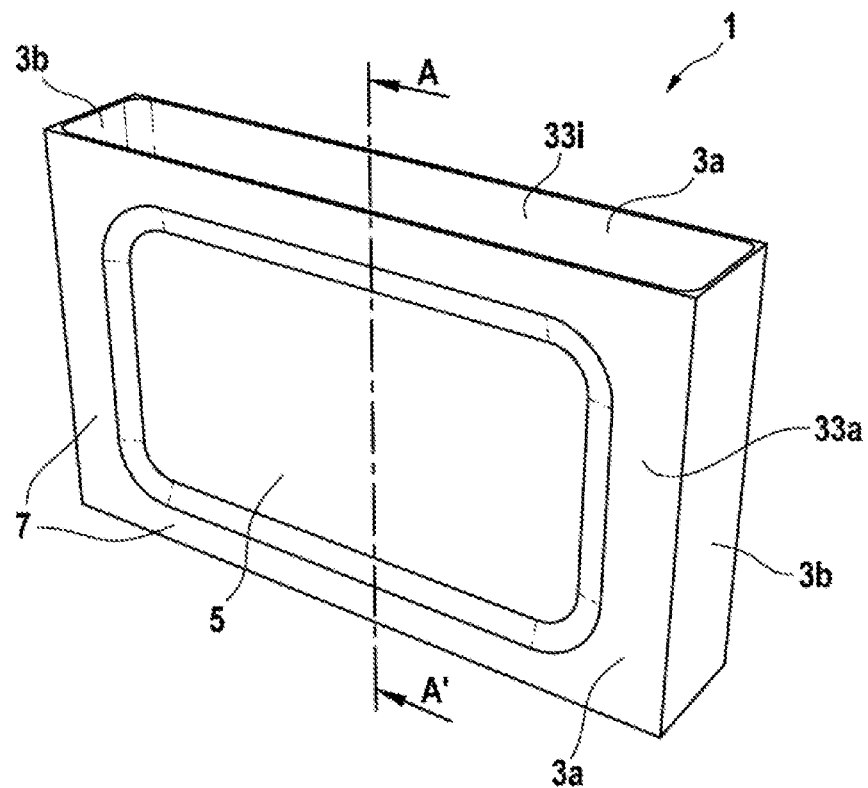
FIG. 1 shows a schematic representation of an insulating molding according to the invention for at least one housing of a battery cell having a depression, in a first form of embodiment, in a 3D view.

FIG. 1 shows a first form of embodiment of an insulating molding 1 for at least one housing of a battery cell. The insulating molding 1 comprises two long molding sidewalls 3a and two short molding sidewalls 3b, which are configured with a full-surface design. The long molding sidewalls 3a each comprise an outer side 33a and an inner side 33i. The insulating molding 1 moreover comprises a molding base, which is not visible in FIG. 1. Alternatively, the insulating molding 1 incorporates no molding base. As a further alternative, the insulating molding 1 comprises an unrepresented molding top cover. The insulating molding 1, on the long molding sidewall 3a, incorporates a depression 5, which is configured in the form of a reduced wall thickness in the long molding sidewall 3a. In FIG. 1, only the depression 5 in one of the long molding sidewalls 3a is visible. In FIG. 1, the reduction in the wall thickness of the long molding sidewall 3a is configured on the outer side 33a of the long molding sidewall 3a, such that a depression 5 is formed in the direction of an opposing long molding sidewall 3a. In FIG. 1, the depression 5 is located in a central zone of the long molding sidewall 3a. The depression 5 is circumferentially enclosed by an edge zone 7 of the long molding sidewall 3a. Alternatively, only one of the long molding sidewalls 3a incorporates a depression 5. As a further alternative, or additionally, one or both of the short molding sidewalls 3b incorporates a depression 5.

The insulating molding 1 is comprised, for example, of a plastic, specifically a thermoplastic material such as, for example, a polyamide, a polyethylene, a polypropylene, a polyethylene terephthalate or a polyvinyl chloride, or mixtures thereof. The insulating molding 1 is produced, for example, as a one-piece component by means of an injection-molding process. Alternatively, the insulating molding 1 can also be comprised of a number of components.

A battery cell, which is not represented in FIG. 1, is insertable in the insulating molding 1. In an unrepresented form of embodiment, the insulating molding 1 itself forms the housing of a battery cell.

Figure 2:
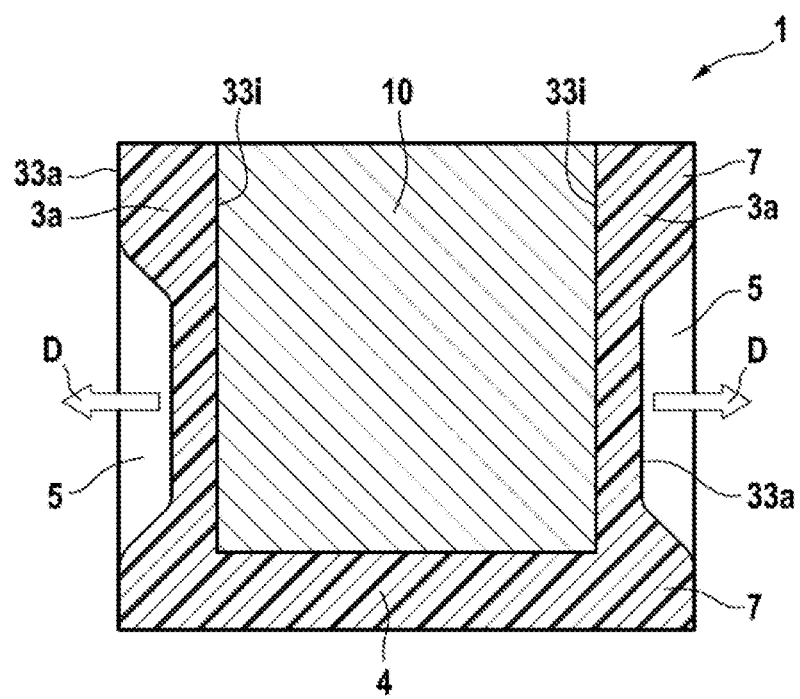
FIG. 2 shows a schematic representation of a vertical section of the insulating molding according to the invention represented in FIG. 1.

FIG. 2 represents the insulating molding 1 according to FIG. 1, in a sectional view along the section line A-A'. In FIG. 2, the depressions 5 are partially cambered. The wall thickness of the long molding sidewall 3a of the insulating molding 1 decreases continuously in the direction of the depression 5 or, leading away from the depression 5, shows a continuous increase. In the center of the depression 5, the wall thickness neither decreases nor increases. Moreover, in this representation, the molding base 4 is visible. Additionally, in FIG. 2, a battery cell 10 is inserted in the insulating molding, such that all the battery cell housing sidewalls of the battery cell 10 are enclosed by the molding sidewalls 3a, 3b of the insulating molding 1, and the battery cell housing base is enclosed by the molding base 4 of the insulating molding 1. Upon the distension of the battery cell 10, the latter compresses the long molding sidewalls 3a in the depression 5 outwardly in the direction of an arrow D.

Figure 3:
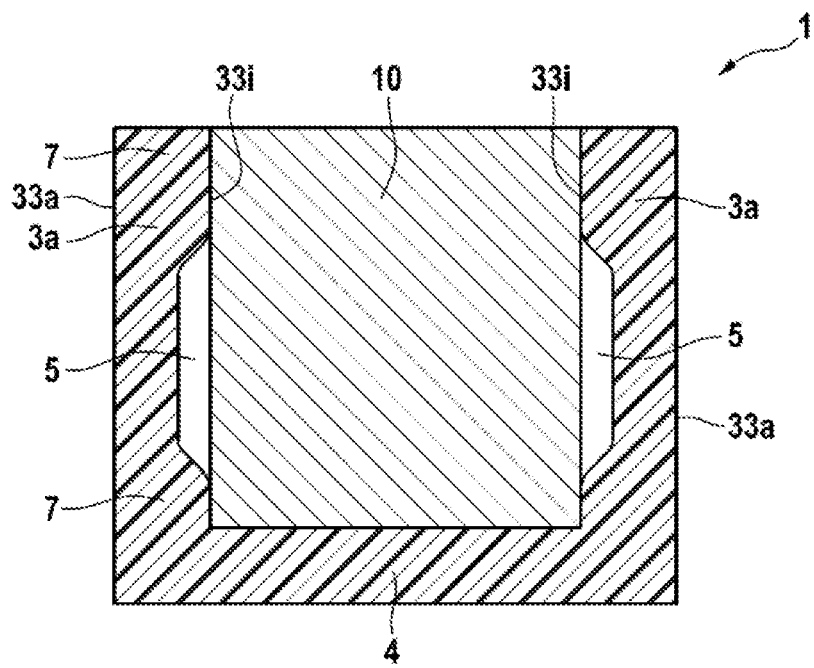
FIG. 3 shows a schematic representation of a vertical section of an insulating molding according to the invention for at least one housing of a battery cell, having a depression, in a second form of embodiment.

FIG. 3 shows a sectional view of a second form of embodiment of an insulating molding 1 according to the invention. Conversely to the first form of embodiment of the insulating molding 1 represented in FIGS. 1 and 2, the reduction in the wall thickness of the long molding sidewalls 3a in FIG. 3 is configured on the inner side 33i of the long molding sidewalls 3a, such that the depression 5 extends away from the battery cell 10 inserted in the insulating molding 1. In FIG. 3, the depressions 5 are partially cambered. The wall thickness of the long molding sidewall 3a of the insulating molding 1 decreases continuously in the direction of the depression 5 or, leading away from the depression 5, shows a continuous increase. In the center of the depression 5, the wall thickness does not change, but remains constant. Upon the distension of the battery cell 10, the battery cell 10 progressively occupies the depression 5 in the insulating molding 1, at least partially.

Figure 4:
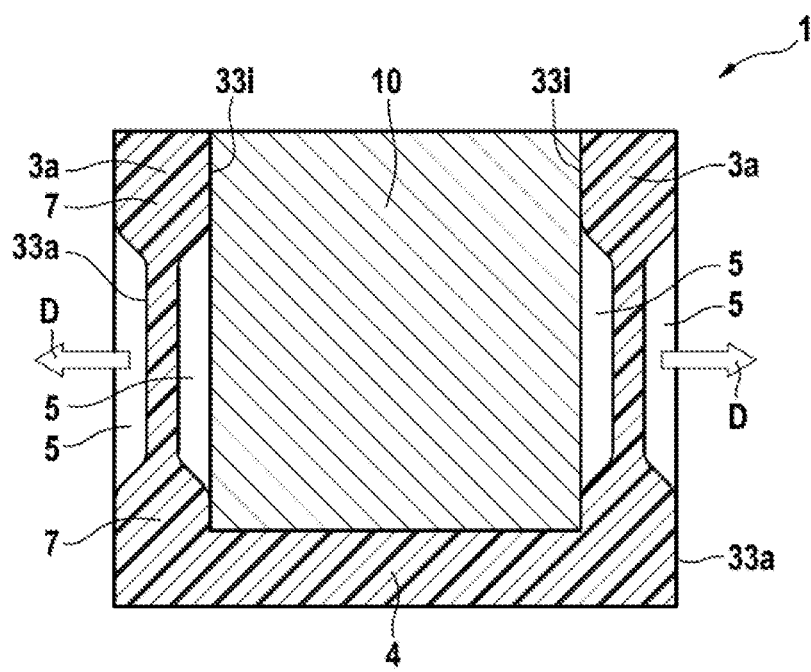
FIG. 4 shows a schematic representation of a vertical section of an insulating molding according to the invention for at least one housing of a battery cell, having a depression, in a third form of embodiment.

FIG. 4 shows a sectional view of a third form of embodiment of an insulating molding 1 according to the invention. Conversely to the first and second forms of embodiment of the insulating molding 1, the reduction in the wall thickness of the long molding sidewalls 3a in FIG. 4 are configured on both the inner side 33i and the outer side 33a. Two depressions 5 are thus configured on each long molding sidewall 3a. The depression 5 which is formed on the outer side 33a of the long molding sidewall 3a of the insulating molding 1 extends towards the battery cell 10 which is enclosed by the insulating molding 1. The depression 5 which is formed on an inner side 33i of the long molding sidewall 3a of the insulating molding 1 extends away from the battery cell 10 which is inserted in the insulating molding 1. In FIG. 3, the depressions 5 are partially cambered. The wall thickness of the long molding sidewall 3a of the insulating molding 1 decreases continuously in the direction of the depression 5 or, leading away from the depression 5, shows a continuous increase. In the center of the depression 5, the wall thickness does not change, and shows no further decrease or increase. The depression 5 on the outer side 33a of the long molding sidewall 3a is arranged in opposition in a mirror image to the depression 5 on the inner side 33i of the long molding sidewall 3a. Alternatively, the depressions 5 are not arranged in opposition, but are configured in a mutually offset arrangement.

Figure 5:
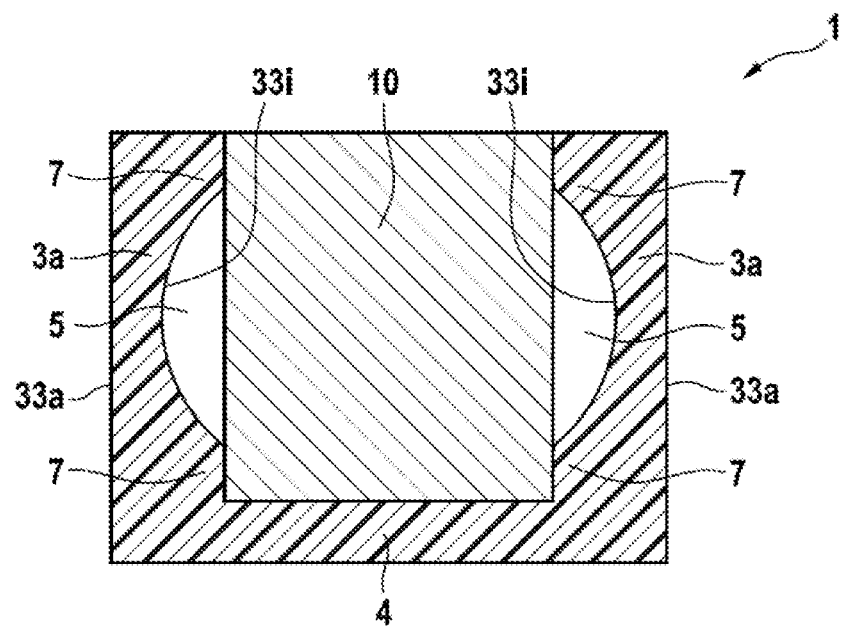
FIG. 5 shows a schematic representation of a vertical section of an insulating molding according to the invention for at least one housing of a battery cell, having a depression, in a fourth form of embodiment.

FIG. 5 shows a sectional view of a fourth form of embodiment of an insulating molding 1 according to the invention. Conversely to the preceding forms of embodiment of the insulating molding 1, the depression 5 is configured as a full camber. This means that the wall thickness of the long molding sidewall 3a in the depression 5 decreases or increases in a continuous manner. Accordingly, there is no step-like transition within the depression 5.

In FIG. 5, the reduction in the wall thickness is configured on the inner side 33i of the long molding sidewall 3a, such that the depression 5 extends way from the battery cell 10 inserted in the insulating molding 1. Alternatively or additionally, for example, corresponding depressions 5 are configured, which are formed by a reduction of the wall thickness on the outer side 33a of the long molding sidewalls 3a.

Figure 6:
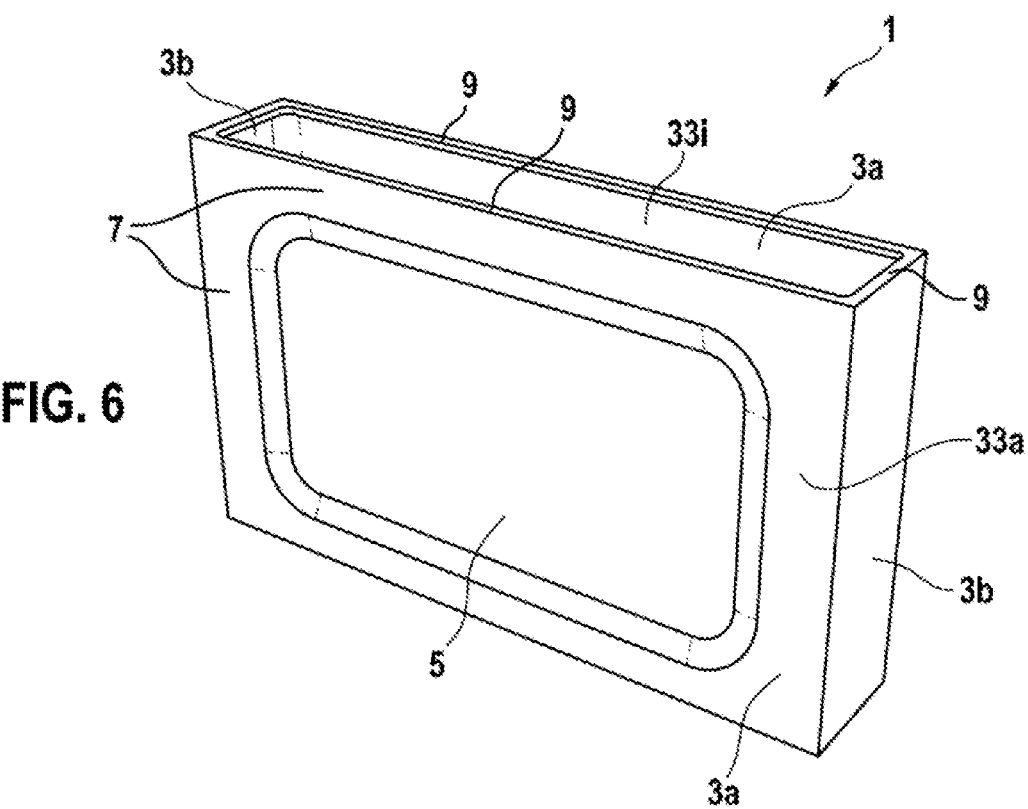
FIG. 6 shows a schematic representation of the insulating molding according to the invention represented in FIG. 1, having a beading, in a 3D view.

FIG. 6 represents the insulating molding 1 according to FIG. 1, with the distinction that the insulating molding 1 is provided with a beading 9 on one edge of the molding sidewalls 3a, 3b. The beading 9 is configured on an upper side of the molding sidewalls 3a, 3b. Alternatively or additionally, the beading 9 is configured on an underside of the molding sidewalls 3a, 3b if, for example, there is no molding base or molding top cover adjoining thereto.

All of the forms of embodiment described can be mutually combined as required. The depressions 5 in the figures are arranged centrally in the long molding sidewalls 3a, and are arranged in mutual opposition. Alternatively or additionally, the depressions 5 are incorporated in the short molding sidewalls 3b. As a further alternative, the depressions 5 are not centrally positioned in the molding sidewalls 3a, 3b. Moreover, the depressions 5, for example, are at least partially arranged at different positions on the same molding sidewall 3a, 3b and/or are at least partially arranged at different positions on two mutually-opposing molding sidewalls 3a, 3b, such that these are not arranged in opposition in mirror image, but are offset.

In one form of embodiment, for example, two or more battery cells, each having an insulating molding 1 according to the invention, are arranged sequentially to form a battery module. In this arrangement, the insulating moldings 1, for example, incorporate depressions 5 of different size and/or of different depth. Alternatively or additionally, the depressions 5 are positioned, for example, on different molding sidewalls 3a, 3b of the insulating molding 1 and/or at different positions on the same molding sidewall 3a, 3b. A battery, having at least two battery cells with an insulating molding 1 according to the invention, can be employed, for example, in motor vehicles, specifically in hybrid or electrically-powered vehicles.

What is claimed is:

1. A battery apparatus including an insulating molding (1) and at least one battery cell, wherein the insulating molding is positioned around a housing of the at least one battery cell, wherein, on at least one molding sidewall (3a, 3b) of the insulating molding (1), a depression (5) is configured, which is constituted by means of a reduced wall thickness, in order to reduce the force acting on the battery cell, wherein the insulating molding (1) is in contact with the housing sidewalls of the battery cell, or wherein the insulating molding (1) is in contact with the housing sidewalls of the battery cell and on a housing base and/or a housing top cover of the battery cell.

2. The insulating molding (1) according to claim 1, characterized in that the insulating molding (1) comprises at least four molding sidewalls (3a, 3b), or in that the insulating molding (1) comprises at least four molding sidewalls (3a, 3b), a molding base (4), and/or comprises a molding top cover.

3. The insulating molding (1) according to claim 1, characterized in that the insulating molding (1) lies on the housing sidewalls of a battery cell, or the insulating molding (1) lies on the housing sidewalls of a battery cell and on a housing base and/or on a housing top cover of a battery cell.

4. The insulating molding (1) according to claim 1, characterized in that the reduction in wall thickness is applied to an outer side (33a) of the at least one molding sidewall (3a, 3b), such that the depression (5) is configured in the direction of the battery cell which is at least partially enclosed by the insulating molding (1).

5. The insulating molding (1) according to claim 1, characterized in that the reduction in wall thickness is applied to an inner side (33$i$) of the at least one molding sidewall (3a, 3b), such that the depression (5) extends away from the battery cell (1) which is at least partially enclosed by the insulating molding (1).

6. The insulating molding (1) according to claim 1, characterized in that the reduction in wall thickness is applied to an inner side (33$i$) and an outer side (33a) of the at least one molding sidewall (3a, 3b), such that two, depressions (5) are configured.

7. The insulating molding (1) according to claim 1, characterized in that the inner side (33$i$) and/or the outer side (33a) of the at least one molding sidewall (3a, 3b), in the region of the reduction in wall thickness, is cambered inwards towards the battery cell, which is at least partially enclosed by the insulating molding (1), or is cambered outwards from the battery cell, which is at least partially enclosed by the insulating molding (1), thus forming the depression (5).

8. The insulating molding (1) according to claim 1, characterized in that the depression (5) is located in a central zone of the at least one molding sidewall (3a, 3b), which is circumferentially enclosed by an edge zone (7) of the at least one molding sidewall (3a, 3b).

9. The insulating molding (1) according to claim 1, characterized in that the insulating molding (1) is configured as a housing for at least one battery cell (10).

10. The insulating molding (1) as claimed in claim 1, characterized in that the insulating molding (1) is comprised of plastic.

11. The insulating molding (1) as claimed in claim 1, characterized in that the insulating molding (1) is produced by an injection-molding process.

12. The insulating molding (1) as claimed in claim 1, characterized in that the insulating molding (1) has a beading (9) at one edge of the molding sidewall (3a, 3b).

13. A battery, comprising at least two battery cells according to claim 1.

14. The battery as claimed in claim 13, wherein the battery cells comprise insulating moldings (1) having depressions (5) of different sizes.

15. The insulating molding (1) according to claim 1, characterized in that the insulating molding (1) comprises at least four molding sidewalls (3a, 3b), which are configured with a full surface design, or in that the insulating molding (1) comprises at least four molding sidewalls (3a, 3b), which are configured with a full-surface design, and a molding base (4), which is configured with a full-surface design, and/or comprises a molding top cover.

16. The insulating molding (1) according to claim 1, characterized in that the insulating molding (1) lies directly on the housing sidewalls of a battery cell, or the insulating molding (1) lies directly on the housing sidewalls of a battery cell and on a housing base and/or on a housing top cover of a battery cell.

17. A battery apparatus including at least one battery cell and an insulating molding (1) in contact with a housing of the at least one battery cell, wherein, on at least one molding sidewall (3a, 3b) of the insulating molding (1), a depression (5) is configured, which is constituted by means of a reduced wall thickness, in order to reduce the force acting on the battery cell, characterized in that the reduction in wall thickness is applied to an inner side (33$i$) and an outer side (33a) of the at least one molding sidewall (3a, 3b), such that two mutually-opposing depressions (5) are configured.

18. An insulating molding (1) for a housing of at least one battery cell, wherein, on at least one molding sidewall (3a, 3b) of the insulating molding (1), a depression (5) is configured, which is constituted by means of a reduced wall thickness, in order to reduce the force acting on the battery cell, wherein the insulating molding (3a, 3b) has a first dimension and a second dimension, and the depression (5) has a third dimension and a fourth dimension, wherein the third dimension of the depression (5) has a length of at least half of the first dimension of the insulating molding (3a, 3b), and the fourth dimension of the depression (5) has a length of at least half of the second dimension of the insulating molding (3a, 3b) and the first and third dimensions and perpendicular to the second and fourth dimensions, wherein the depression has a surface area defined by the third and fourth dimensions.

19. An insulating molding (1) for a housing of at least one battery cell, wherein, on at least one molding sidewall (3a, 3b) of the insulating molding (1), a depression (5) is configured, which is constituted by means of a reduced wall thickness, in order to reduce the force acting on the battery cell, wherein the depression (5) has a first set of opposing sides, a second set of opposing sides, and a planar surface between one of the sets of opposing sides, wherein an area of the planar surface is at least half of an area of a surface of the at least one molding sidewall.

* * * * *